United States Patent Office 3,087,822
Patented Apr. 30, 1963

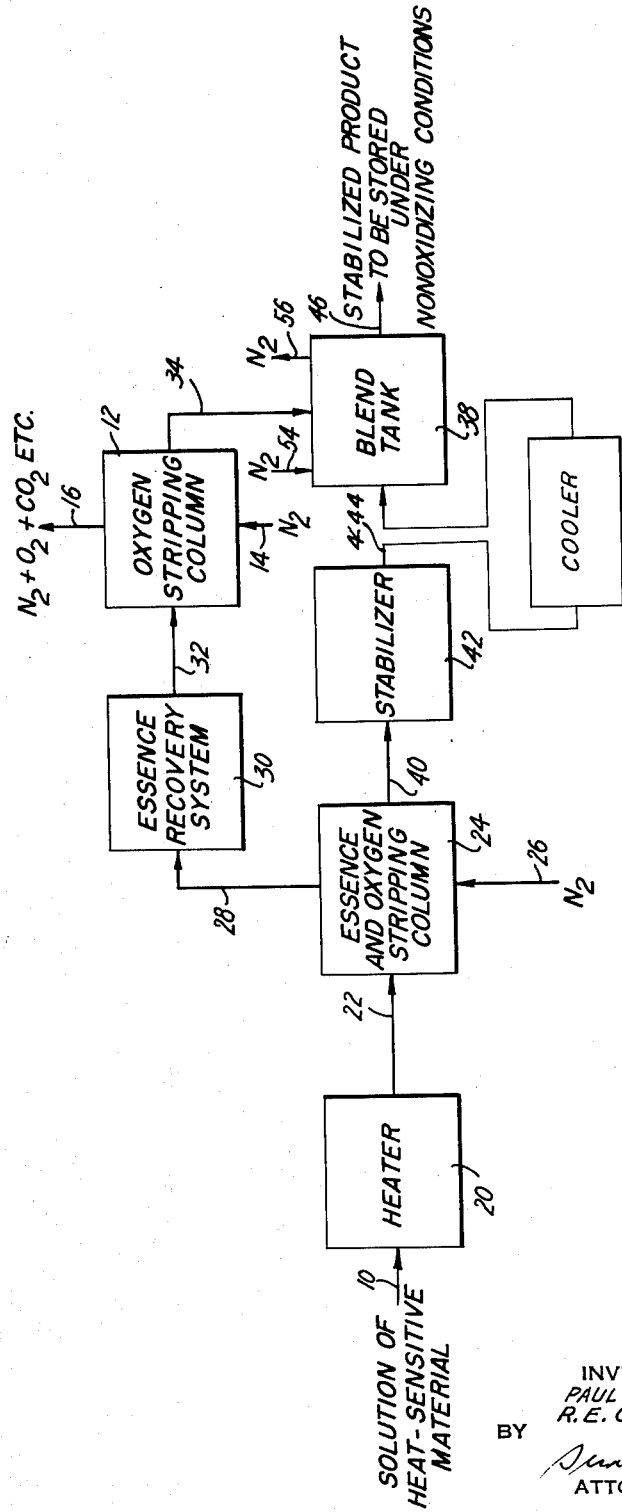

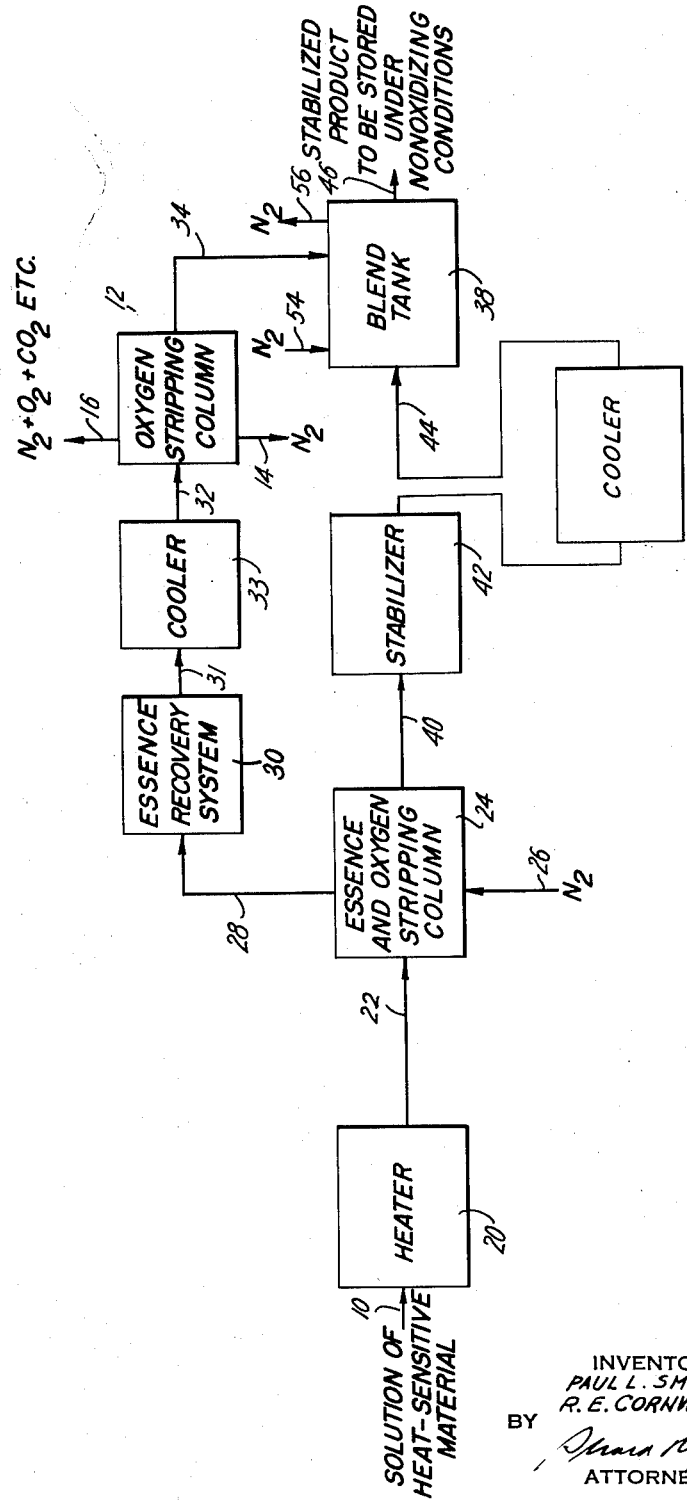

3,087,822
PROCESS FOR PREPARING STABILIZED SOLUTION OF HEAT-SENSITIVE MATERIAL
Paul L. Smith, Orlando, and Ross E. Cornwell, Jacksonville, Fla., assignors to Union Carbide Corporation, a corporation of New York
Filed Jan. 19, 1961, Ser. No. 83,819
4 Claims. (Cl. 99—155)

The present invention relates to a process for preparing a stabilized solution of heat-sensitive material and, more particularly, to a process for preserving the essence of a stabilized solution of heat-sensitive material.

Heretofore, several processes have been proposed to stabilize solutions of heat-sensitive material by destroying substances in the solutions which cause deterioration during storage. Since this stabilization is usually accomplished by raising the temperature of the solution to a temperature sufficiently high to achieve the desired stability, many of the desirable qualities of the original solution are usually changed during the stabilizing process by the increased temperature. One way to avoid this quality deterioration is to remove the essence of the solution before it is subjected to the stabilizing process, and then add the removed essence back to the stabilized solution.

It has been previously proposed to remove the essence of a solution by vacuum deaeration. However, when such a process is used, it is usually difficult to condense the essence in a cooled body of liquid. As a result, condensing surfaces must be employed at extremely low temperatures, and it is practically impossible to condense all of the removed essence.

It is, therefore, the main object of the present invention to provide a process for preserving the essence of a stabilized solution of heat-sensitive material.

Another object of the invention is to provide a novel process for removing the essence from a solution of heat-sensitive material, whereby the removed essence can be easily condensed, absorbed, or dissolved in a cooled body of liquid.

A further object of the invention is to provide a process for preventing oxidation of the essence of a solution of heat-sensitive material.

Other aims and advantages of the invention will be apparent from the following description and appended claims.

As employed herein, the following terms have the following meanings:

The term "heat-sensitive material" refers to any material susceptible to an adverse change in its properties or composition brought about solely by the effect of heat, the degree of change varying with both time and temperature. Typical examples of solutions of heat-sensitive material are fruit juices, beer, wines, coffee, and vegetable juices.

The term "essence" of a solution of heat-sensitive material refers to those organic flavoring constituents of the solution which are present in various combinations to produce a recognizable and characteristic odor and flavor. These constituents usually are present in low concentrations, exert appreciable vapor pressures that are often equal to or higher than that of water, and are commonly subject to oxidation. The essences of four typical fruit juices are shown in the following table:

*Compositions of Essences of Fruit Juices*

Apple juice:
    Alcohols (92%)—
        Methanol
        Ethyl alcohol
        n-Propyl alcohol
        2-propanol
        n-Butyl alcohol Apple juice—Continued
    Alcohols (92%)—Continued
        Isobutyl alcohol
        d-2-methyl-1-butanol
        n-Hexyl alcohol
    Carbonyl compounds (6%)—
        Acetaldehyde
        Acetone
        Caproaldehyde
        2-hexanol
    Esters (2%)—
        Ethyl butyrate
        Ethyl caproate Orange juice:
    Ethyl alcohol
    Acetone
    Acetaldehyde
    Formic acid
    Amyl alcohol
    Isoamyl alcohol
    Phenylethyl alcohol
    Typical methyl and ethyl esters of formic, acetic and caproic acids, such as—
        Methyl formate
        Ethyl formate
        Methyl acetate
        Ethyl acetate
        Methyl caproate
        Ethyl caproate Pineapple juice:
    Ethyl acetate
    Ethyl alcohol
    Acetaldehyde
    Acetic acid
    Methyl isocaproate
    Methyl iso-valerate
    Methyl n-valerate
    Methyl capyrylate
    Sulfur compounds
    Ethyl iso-valerate
    Ethyl acrylate
    Ethyl n-caproate Grape juice: Methyl anthranilate In accordance with the present invention there is provided a process for stabilizing a solution of heat-sensitive material comprising subjecting the solution to a first stripping operation wherein an inert gas is passed through the solution so as to preferentially displace substantially all the oxygen present in the solution; increasing the temperature of the solution which has been subjected to the stripping operation to a temperature slightly below that at which significant thermo-chemical change can be produced; removing essence from the solution by subjecting the solution to a second stripping operation wherein an inert gas is passed through the solution so as to preferentially remove substantially all the essence present in the solution; stabilizing the solution from which the essence has been removed by increasing the temperature of the solution; and combining the essence and stabilized solution, the essence and the solution being continuously maintained in a nonoxidizing atmosphere throughout all process steps subsequent to the oxygen removal step.

In order to prevent deterioration of the essence of the solution being treated, the process of the present invention removes oxygen from the solution and the essence by subjecting the fresh single-strength solution to a stripping operation wherein a substantially inert gas, such as nitrogen, is passed through the essence or the solution so as to preferentially displace substantially all the oxygen present in the solution. This stripping operation removes the oxygen from the solution with a minimum of essence materials, whereas the conventional vacuum deaeration process for removing oxygen from a solution by subjecting the solution to a vacuum removes a substantial portion of the essence of the solution along with the oxygen. Thus, the oxygen stripping column employed in the inventive process essentially removes only oxygen from the solution being treated, and the essence remains in the solution. After the oxygen has been removed, subsequent contamination of both the essence and the solution is minimized by maintaining the essence and the solution in a nonoxidizing atmosphere.

The inventive process effects the removal of the essence from the deoxygenated solution by increasing the temperature of the solution and then subjecting the solution to a stripping operation essentially the same as that employed to remove the oxygen. Since the deoxygenated solution has been heated, the second stripping operation becomes one of essence removal. The exact temperature to which the solution is raised depends on the vapor pressure of the essence to be removed, the flow rate of the stripping gas in the essence stripping column, and the temperature at which the desirable qualities of the solution are changed. As the temperature of the solution is increased, the vapor pressure of the essence of the solution is increased, and the flow rate of the stripping gas required to remove the essence is decreased. In other words, as the vapor pressure of the essence is increased, the flow rate of stripping gas required is decreased. Thus, in order to reduce the flow rate of stripping gas to a minimum, the temperature of the solution should be increased until the vapor pressure of the essence is a maximum. However, the temperature to which the solution can practically be raised is limited to the temperature at which undesirable changes are effected in the solution, which is usually below 190° F. As a result, the temperature of the solution is usually raised to a temperature slightly below that at which significant thermochemical change can be produced. Thus, the minimum flow rate of stripping gas is actually determined by the maximum temperature to which the solution can be raised without deteriorating the quality of the solution.

Any gas which is chemically inert to the solution, such as nitrogen, argon, hydrogen, and helium, and mixtures thereof, may be used in the essence and oxygen stripping steps. Carbon dioxide may be used where a carbonated flavor is not objectionable.

In the drawings:

FIG. 3 is a flow sheet of another modified process embodying the present invention; and FIG. 4 is a flow sheet of a further modified process embodying the invention.

Figure 1:
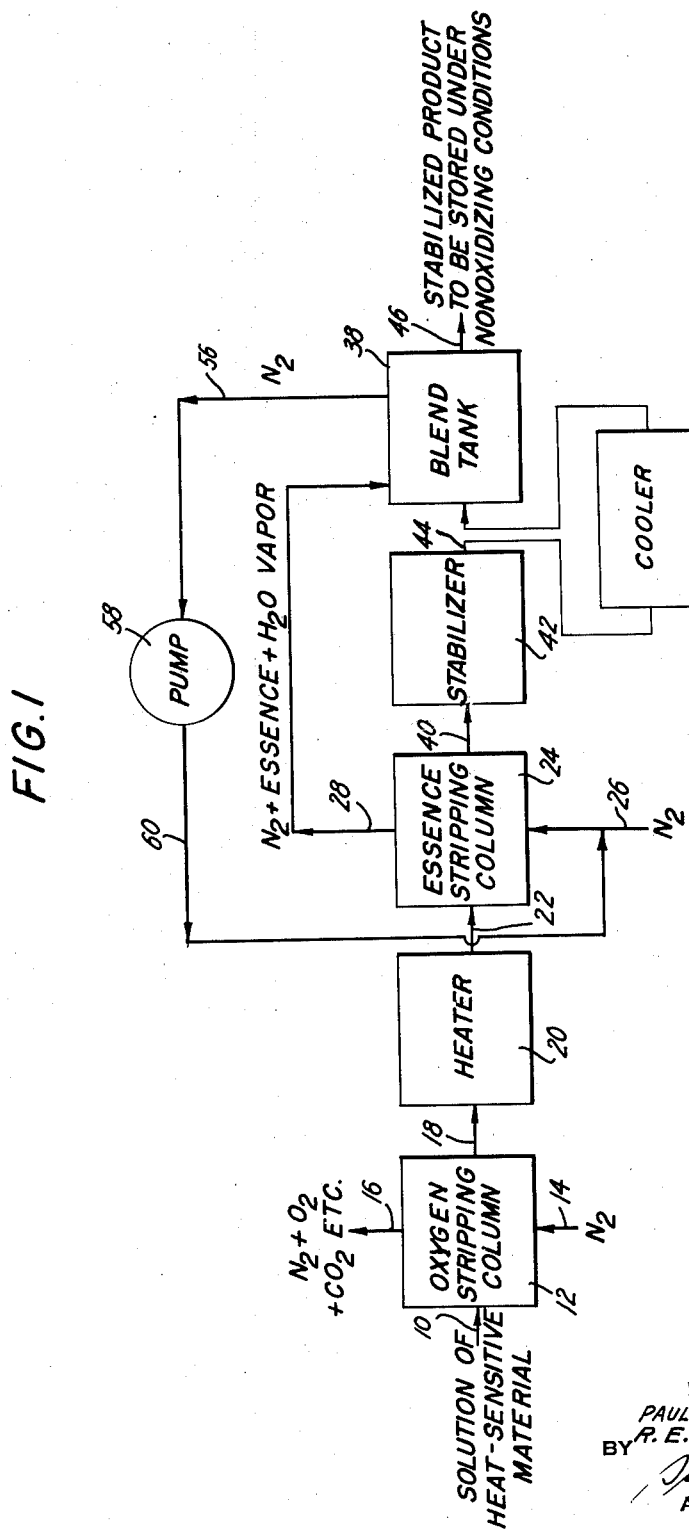
FIG. 1 is a flow sheet of a preferred process embodying the present invention.

The process of the invention will now be explained in greater detail by referring to the drawings.

In the preferred process of FIG. 1, a solution of heat-sensitive material is supplied through a line 10 to an oxygen stripping column 12. An inert stripping gas, preferably nitrogen, is fed into the bottom of the stripping column 12 through a line 14 so as to pass up through the solution and preferentially displace substantially all the oxygen present in the solution. To provide adequate protection for extended storage periods, it is preferable to reduce the oxygen content of the solution to a concentration below 0.4 part per million. The nitrogen gas and entrained oxygen and carbon dioxide are discharged through an exhaust line 16. Since the oxygen is removed from the solution by the stripping operation rather than by a vacuum deaeration process, most of the essence remains in the solution.

From the oxygen stripping column 12, the nitrogen-stripped, deoxygenated solution is passed through a line 18 into a heater 20, wherein the temperature of the solution is increased to a temperature slightly below that at which significant thermochemical change can be produced. From the heater 20, the solution passes through a line 22 into an essence stripping column 24. Although the essence stripping column 24 is the same as that previously employed to remove oxygen from the solution, the heating of the solution effected by heater 30 changes the stripping operation from one of oxygen removal to one of essence removal. An inert stripping gas, preferably nitrogen, is fed into the bottom of the stripping column 24 through a line 26 so as to pass up through the solution and preferentially remove substantially all the essence present in the solution. As described above, the exact flow rate of the stripping gas in the essence stripping column 24 depends on the temperature of the solution, i.e., the vapor pressure of the essence to be removed. The nitrogen gas and entrained essence and water vapor are discharged from the essence stripping column 24 through a line 28 into a blend tank 38. The condensable essence and water vapor are condensed in the solution in the blend tank 38, and the noncondensable nitrogen is discharged through a line 56. The discharged nitrogen is then recycled by a pump 58 through a line 60 back into the essence stripping column 24. Any losses in the recycled gas due to leaks in the system and solubility of the gas in the solution being treated are made up by gas from the original feed line 26.

The residue solution in the essence stripping column 24 is passed through a line 40 into a stabilizer 42, wherein the temperature of the solution is increased to a temperature sufficiently high to effect the desired stability. The solution is then rapidly cooled, and the stabilized solution is passed through a line 44, into the blend tank 38, wherein the essence from line 28 is absorbed, dissolved, and/or condensed in the stabilized solution. The blended product is removed from the blend tank through line 46 and stored under non-oxidizing conditions.

After the feed solution has been deoxygenated in stripping column 12, it is essential that both the solution and the essence be continuously maintained in a non-oxidizing atmosphere in order to minimize subsequent contamination. Thus, it is important that both the heater 20 and the stabilizer 42 be airtight. Alternatively, may head space in the heater and stabilizer may be filled with a non-oxidizing purge gas. The blend tank 38 is provided with a non-oxidizing atmosphere by the nitrogen gas entering along with the essence through line 28.

Figure 2:
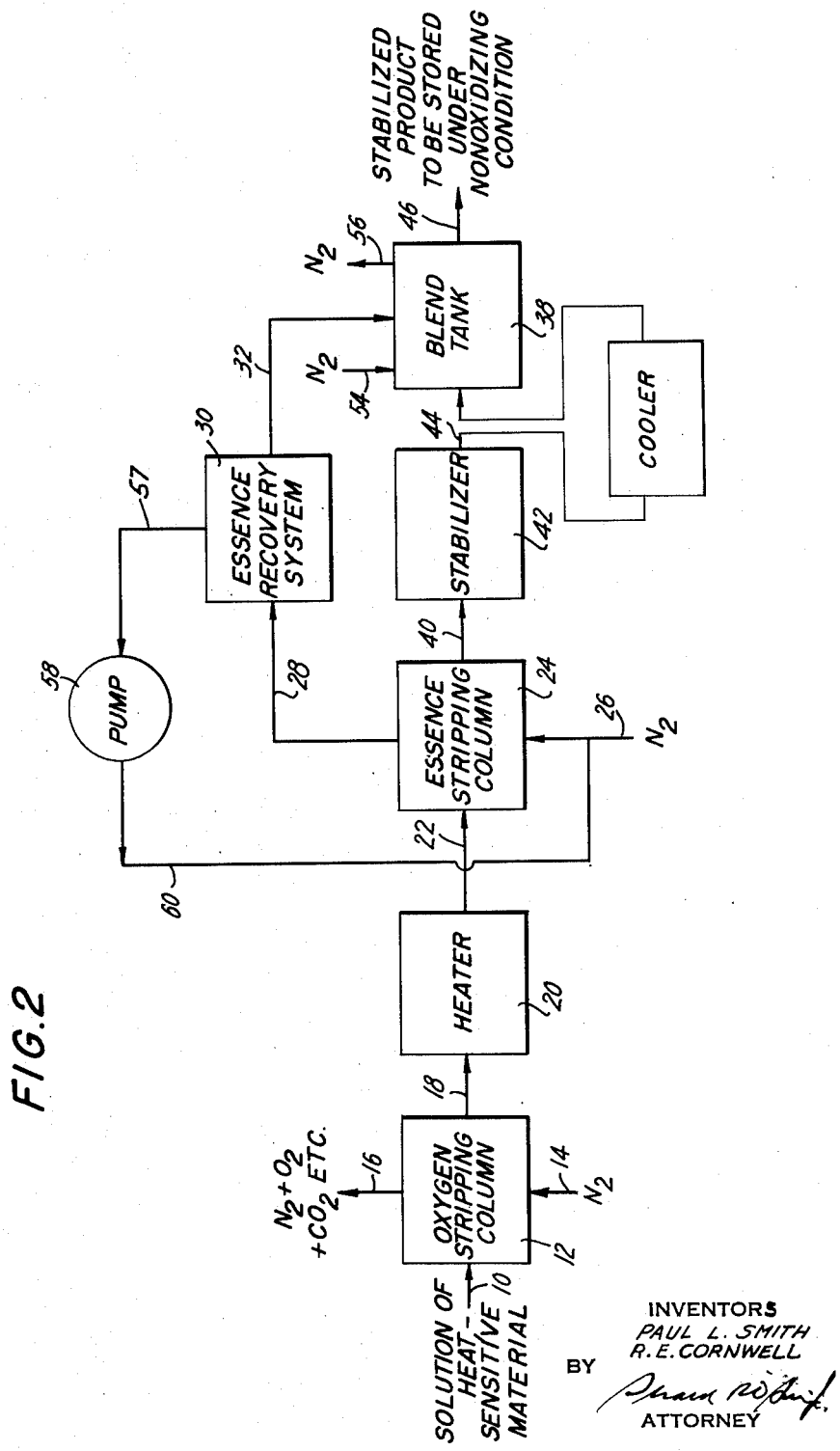
FIG. 2 is a flow sheet of a modified process embodying the present invention.

In the modified embodiments of FIGS. 2 to 4 of the drawings, elements have been assigned the same numbers as assigned equivalent elements in the preferred embodiment of FIG. 1.

In the modified embodiment of FIG. 2, the process is the same as that of FIG. 1 except that the removed essence is passed through an essence recovery system 30 before being combined with the stabilized solution in the blend tank 38. The essence discharged from the essence stripping column 24 is passed through line 28 into the essence recovery system 30 wherein the essence is preferably recovered by absorbing, dissolving, and/or condensing the essence in a cooled body of the solution being treated. The cooling body of solution is also previously stabilized. Alternatively, the removed essence may be condensed by any convenient heat exchanger. From the essence recovery system 30, the recovered essence is passed through a line 32 into the blend tank 38 where it is combined with the stabilized solution.

The non-condensable nitrogen from the essence stripping column 24 is discharged from the essence recovery system 30 through a line 57, and recycled by pump 58 through line 50 back to the essence and oxygen stripping column 24. As in FIG. 1, any losses in the recycled gas are made up by gas from the original feed line 26. A nonoxidizing purge gas is supplied to the blend tank 38 through a line 54 and discharged through line 56.

In the modified embodiment of FIG. 3, the process is the same as that of FIG. 2 except that the oxygen stripping column 12 is employed in the essence line rather than in the solution feed line. Since oxygen is still present in the solution entering the essence and oxygen stripping column 24, the nitrogen gas fed into the bottom of column 24 through line 26 removes both the oxygen and the essence present in the solution. The nitrogen gas and entrained oxygen and essence are discharged through a line 28 and passed into an essence recovery system 30, such as that described for FIG. 2, wherein at least some of the oxygen is recovered along with the essence. From the essence recovery system 30, the recovered, oxygen-containing essence is passed through line 32 into the oxygen stripping column 12. An inert stripping gas, preferably nitrogen, is fed into the bottom of the stripping column 12 through a line 14 so as to pass up through the essence and preferentially displace substantially all the oxygen present in the essence. The deoxygenated essence is then passed through line 34 into the blend tank 38 wherein the essence is combined with the stabilized solution. A nonoxidizing purge gas is supplied to the blend tank 38 through a line 54 and discharged through line 56.

In the modified embodiment of FIG. 4, the process is the same as that of FIG. 3 except that the recovered essence discharged from the essence recovery system 30 is passed through a cooler before being passed into the oxygen stripping column 12. The essence discharged from the recovery system 30 is passed through a line 31 into a cooler 33 wherein the temperature of the essence is decreased to between about 35° and 50° F. The purpose of this cooling step is to reduce the vapor pressure of the volatile flavoring constituents so that they are not removed by the subsequent oxygen stripping step. Cooler 33 preferably comprises a cooled, stabilized body of the solution being treated, by may be any convenient heat exchanger. From the cooler 33, the cooled essence or essence-containing solution is passed through line 32 into the oxygen stripping column 12, wherefrom deoxygenated essence is passed through line 34 into the blend tank 38. Cooler 33 is preferably airtight, but may be purged with a non-oxidizing purge gas.

Of course, other modified processes can be devised within the scope of the invention described herein. For example, if a completely sterilized product is desired, the removed essence is passed through a sterile filter before being blended with the stabilized solution. In any event, however, it is essential that either the solution and contained essence be deoxygenated prior to essence removal or that the essence be separately deoxygenated after separation.

What is claimed is:

1. A process for stabilizing a solution selected from the group consisting of fruit juices, beer, wines, coffee, and vegetable juices comprising: subjecting said solution to a first stripping operation wherein an inert gas is passed through said solution so as to preferentially displace substantially all the oxygen present in said solution; increasing the temperature of said solution which has been subjected to said first stripping operation to a temperature slightly below that at which significant thermochemical change can be produced; removing essence from said solution by subjecting said solution to a second stripping operation wherein an inert gas is passed through said solution so as to preferentially remove substantially all the volatile essence present in said solution; stabilizing the solution from which said essence has been removed by increasing the temperature of said solution to a temperature sufficiently high to effect the desired stability; and combining said essence and said stabilized solution, said essence and said solution being continuously maintained under nonoxidizing conditions throughout all process steps subsequent to the oxygen removal step.

2. A process for stabilizing a solution selected from the group consisting of fruit juices, beer, wines, coffee, and vegetable juices comprising: subjecting said solution to a first stripping operation wherein an inert gas is passed through said solution so as to reduce the oxygen present in said solution to a concentration below 0.4 parts per million; increasing the temperature of said solution which has been subjected to said stripping operation to a temperature slightly below that at which significant thermochemical change can be produced; removing essence from said solution by subjecting said solution to a second stripping operation wherein an inert gas is passed through said solution so as to remove substantially all the volatile essence present in said solution; stabilizing the solution from which said essence has been removed by increasing the temperature of said solution to a temperature sufficiently high to effect the desired stability; rapidly cooling the resulting stabilized solution; and combining said essence and said stabilized solution by passing said essence into said stabilized solution, said essence and said solution being continuously maintained under nonoxidizing conditions throughout all process steps subsequent to the oxygen removal step.

3. A process for stabilizing a solution selected from the group consisting of fruit juices, beer, wines, coffee, and vegetable juices comprising: subjecting said solution to a first stripping operation wherein an inert gas is passed through said solution so as to preferentially displace substantially all the oxygen present in said solution; increasing the temperature of said solution which has been subjected to said first stripping operation to a temperature slightly below that at which significant thermochemical change can be produced; removing the volatile essence from said solution by subjecting said solution to a second stripping operation wherein an inert gas is passed through said solution so as to preferentially remove substantially all the essence present in said solution; recovering the removed essence by introducing said essence into a body of stabilized solution of substantially the same composition as that of the solution from which said essence has been removed; stabilizing the solution from which said essence has been removed by increasing the temperature of said solution to a temperature sufficiently high to effect the desired stability; and combining the recovered essence and said stabilized solution, said essence and said solution being continuously maintained under nonoxidizing conditions throughout all process steps subsequent to the oxygen removal step.

4. A process for stabilizing a solution selected from the group consisting of fruit juices, beer, wines, coffee, and vegetable juices comprising: increasing the temperature of said solution to a temperature slightly below that at which significant thermochemical change can be produced; removing the volatile essence and oxygen from said solution by subjecting said solution to a first stripping operation wherein an inert gas is passed through said solution so as to preferentially remove substantially all the essence and oxygen present in said solution; recovering the removed essence; decreasing the temperature of the removed essence to between about 35° F. and about 50° F.; subjecting the recovered essence to a stripping operation wherein an inert gas is passed through said essence so as to preferentially displace substantially all the oxygen present in said essence; stabilizing the solution from which said essence has been removed by increasing the temperature of said solution to a temperature suffiiciently high to effect the desired stability; and combining said essence and said stabilized solution; said solution being continuously maintained under nonoxidizing conditions throughout all process steps subsequent to the essence and oxygen removal step.

References Cited in the file of this patent
UNITED STATES PATENTS

| | | |
|---|---|---|
| 2,666,707 | Beu | Jan. 19, 1954 |
| 2,714,573 | Fessler | Aug. 2, 1955 |
| 2,911,308 | Smith | Nov. 3, 1959 |